United States Patent
Sun et al.

(10) Patent No.: US 8,173,282 B1
(45) Date of Patent: May 8, 2012

(54) PERPENDICULAR MAGNETIC RECORDING MEDIUM WITH AN ORDERING TEMPERATURE REDUCING LAYER

(75) Inventors: Chengjun Sun, Naperville, IL (US); B. Ramamurthy Acharya, Fremont, CA (US)

(73) Assignee: WD Media, Inc., San Jose, CA (US)

( * ) Notice: Subject to any disclaimer, the term of this patent is extended or adjusted under 35 U.S.C. 154(b) by 0 days.

(21) Appl. No.: 12/636,604

(22) Filed: Dec. 11, 2009

(51) Int. Cl.
*G11B 5/66* (2006.01)

(52) U.S. Cl. ............... 428/831; 427/131; 204/192.1

(58) Field of Classification Search .............. None
See application file for complete search history.

(56) References Cited

U.S. PATENT DOCUMENTS

| | | | |
|---|---|---|---|
| 5,603,766 A | 2/1997 | Visokay et al. |
| 5,824,409 A | 10/1998 | Sellmyer et al. |
| 6,007,623 A | 12/1999 | Thiele et al. |
| 6,086,974 A | 7/2000 | Thiele et al. |
| 6,139,907 A | 10/2000 | Sellmyer et al. |
| 6,183,606 B1 | 2/2001 | Kuo et al. |
| 6,468,670 B1 | 10/2002 | Ikeda et al. |
| 6,599,646 B2 | 7/2003 | Suzuki et al. |
| 6,716,516 B2 | 4/2004 | Futamoto et al. |
| 6,824,817 B2 | 11/2004 | Araki et al. |
| 6,830,824 B2 | 12/2004 | Kikitsu et al. |
| 6,834,026 B2 | 12/2004 | Fullerton et al. |
| 6,846,583 B2 | 1/2005 | Inaba et al. |
| 6,881,495 B2 | 4/2005 | Kikitsu et al. |
| 6,881,496 B2 | 4/2005 | Okamoto |
| 6,881,497 B2 | 4/2005 | Coffey et al. |
| 7,081,309 B2 | 7/2006 | Do et al. |
| 7,195,827 B2 * | 3/2007 | Maeda et al. ............. 428/831 |
| 7,241,520 B2 | 7/2007 | Shin et al. |
| 7,282,278 B1 | 10/2007 | Nolan |
| 7,286,324 B2 | 10/2007 | Yasui et al. |
| 7,384,699 B2 | 6/2008 | Nolan et al. |
| 7,425,377 B2 | 9/2008 | Fullerton et al. |
| 7,435,489 B2 | 10/2008 | Umeda et al. |
| 7,488,545 B2 | 2/2009 | Fullerton et al. |
| 7,550,210 B2 | 6/2009 | Berger et al. |
| 7,556,870 B2 | 7/2009 | Do et al. |
| 7,572,526 B2 | 8/2009 | Berger et al. |
| 7,582,368 B2 | 9/2009 | Berger et al. |
| 7,625,643 B2 | 12/2009 | Umeda et al. |
| 7,638,210 B2 | 12/2009 | Berger et al. |
| 7,736,769 B2 | 6/2010 | Ajan |
| 2002/0041980 A1 | 4/2002 | Suzuki et al. |
| 2003/0108721 A1 | 6/2003 | Fullerton et al. |
| 2003/0162041 A1 | 8/2003 | Nemoto et al. |
| 2004/0110035 A1 | 6/2004 | Shin et al. |
| 2004/0185307 A1 | 9/2004 | Oikawa et al. |

(Continued)

FOREIGN PATENT DOCUMENTS

WO 2008030199 A1 3/2008

(Continued)

OTHER PUBLICATIONS

English machine translation of JP 08-30951, Japan, Feb. 1996.*

(Continued)

*Primary Examiner* — Holly Rickman (57) ABSTRACT

FePt-based perpendicular magnetic recording (PMR) media including an ordering temperature reducing layer between a bottom FePtX magnetic recording layer and a nucleation layer. In one embodiment, an ordering temperature reducing layer of carbon is employed to lower the L10 ordering temperature of a FePtC recording layer.

17 Claims, 7 Drawing Sheets

U.S. PATENT DOCUMENTS

| | | | |
|---|---|---|---|
| 2004/0191578 | A1 | 9/2004 | Chen et al. |
| 2006/0166039 | A1 | 7/2006 | Berger et al. |
| 2006/0177704 | A1 | 8/2006 | Berger et al. |
| 2006/0188743 | A1 | 8/2006 | Seki et al. |
| 2007/0009654 | A1* | 1/2007 | Watanabe et al. .......... 427/126.3 |
| 2007/0026262 | A1 | 2/2007 | Maeda |
| 2007/0231609 | A1 | 10/2007 | Ajan et al. |
| 2007/0292720 | A1 | 12/2007 | Suess |
| 2008/0180843 | A1 | 7/2008 | Zhang et al. |
| 2008/0292907 | A1 | 11/2008 | Berger et al. |
| 2008/0311430 | A1 | 12/2008 | Chen et al. |
| 2009/0257147 | A1* | 10/2009 | Ajan ........................ 360/125.02 |
| 2009/0290256 | A1 | 11/2009 | Berger et al. |
| 2010/0062286 | A1 | 3/2010 | Suess |
| 2010/0128391 | A1 | 5/2010 | Berger et al. |

FOREIGN PATENT DOCUMENTS

| | | |
|---|---|---|
| WO | 2008/030199 | 4/2010 |

OTHER PUBLICATIONS

Wang, Jian-Ping et al., "Exchange Coupled Composite Media for Perpendicular Magnetic Recording", IEEE Transactions on Magnetics, vol. 41, No. 10, pp. 3181-3186, Oct. 2005.

Hu, Jiang Feng et al., "Exchange Coupling Assisted FePtC Perpendicular Recording Media", Applied Physics Letters 93, 072504 pp. 1-3, Aug. 2008.

Chen, Jing Sheng et al., "High Coercivity L10 FePt Films with Perpendicular Anisotropy Deposited on Glass Substrate at Reduced Temperature", Applied Physics Letters 90, 042508 pp. 1-3, Jan. 2007.

H. Nakagawa, et al., "Effects of Thin Carbon Intermediate Layer on Magnetic and Structural Properties of Perpendicular Recording Media", Journal of Magnetism and Magnetic Materials, 235, pp. 73-77, 2001.

Zhu, Jimmy, "Understand PMR Media," Data Storage Systems Center, Carnegie Mellon University, 2009, 16 pages.

\* cited by examiner

PERPENDICULAR MAGNETIC RECORDING MEDIUM WITH AN ORDERING TEMPERATURE REDUCING LAYER

TECHNICAL FIELD

This invention relates to the field of disk drives and more specifically, to L10-structured perpendicular magnetic recording media for disk drives.

BACKGROUND

The substrates of magnetic recording media are typically glass or aluminum. Glass substrate supply constraints have resulted in aluminum becoming the preferred substrate. However, if the recording media processing temperature exceeds a threshold, an amorphous nickel phosphorous (NiP) layer employed with aluminum substrates is subject to crystallization, magnetization and surface roughening which can render a media unusable. Thus, recording media layer microstructure and magnetic properties are frequently limited by the thermal constraints imposed by the NiP layer.

Figure 1:
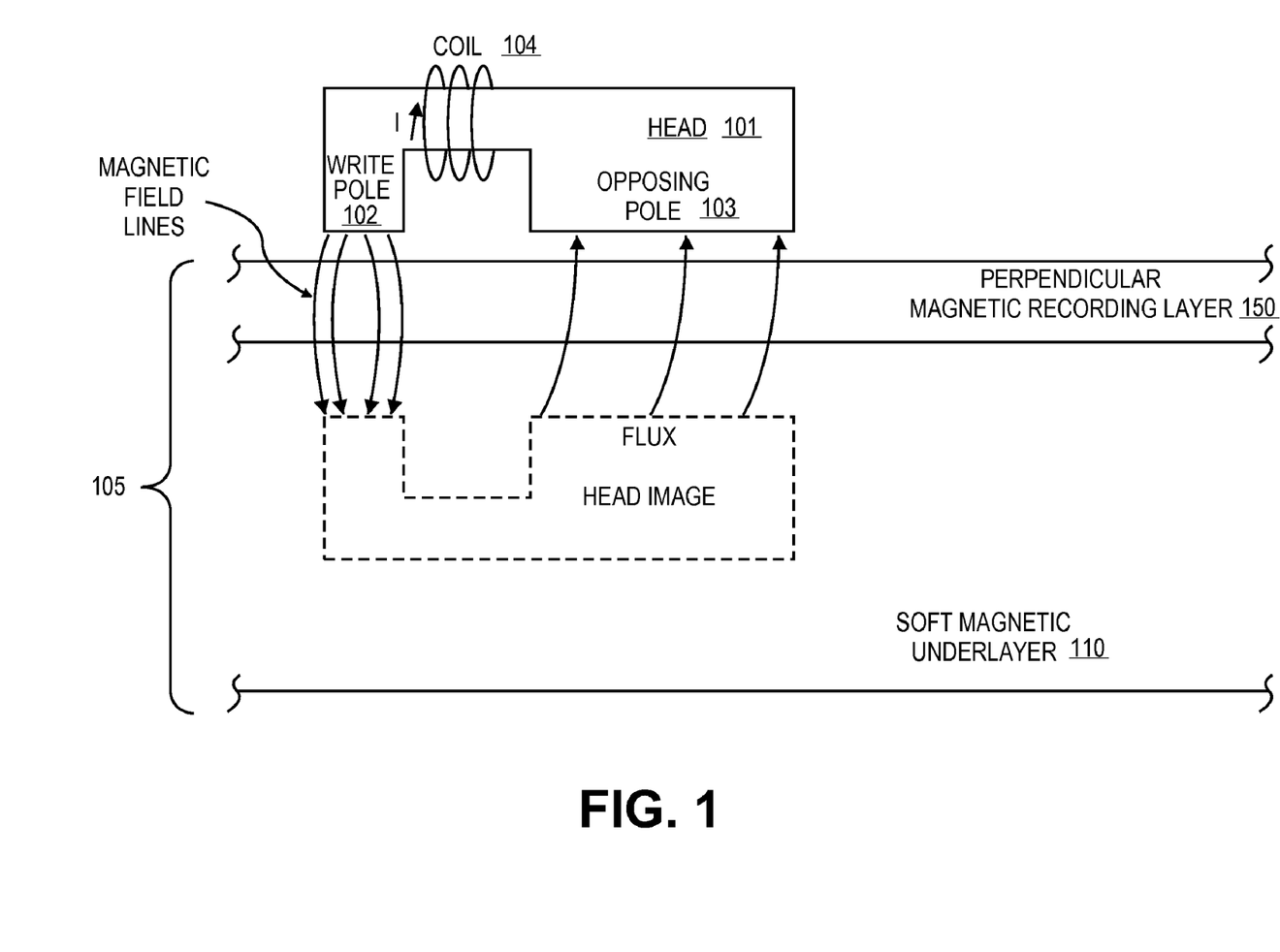
FIG. 1 illustrates a conventional perpendicular recording disk drive system.

For all types of substrates, magnetic recording media has begun to incorporate perpendicular magnetic recording (PMR) technology in an effort to increase areal density and is now working toward densities of 800 Gbits/in$^2$. Generally, PMR media may be partitioned into two primary functional regions: a soft magnetic underlayer (SUL) and a magnetic recording layer(s) (RL). FIG. 1 illustrates portions of a conventional perpendicular magnetic recording disk drive system having a recording head 101 including a trailing write pole 102 and a leading return (opposing) pole 103 magnetically coupled to the write pole 102. An electrically conductive magnetizing coil 104 surrounds the yoke of the write pole 102. The bottom of the opposing pole 103 has a surface area greatly exceeding the surface area of the tip of the write pole 102. As the magnetic recording disk 105 is rotated past the recording head 101, current is passed through the coil 104 to create magnetic flux within the write pole 102. The magnetic flux passes from the write pole 102, through the disk 105, and across to the opposing pole 103 to record in the PMR layer 150. The SUL 110 enables the magnetic flux from the trailing write pole 102 to return to the leading opposing pole 103 with low impedance.

Higher areal densities are typically achieved with well-isolated smaller grains in the PMR layer 150. A higher magnetic anisotropy constant ($K_u$) is typically required to resist the demagnetization effects of the perpendicular geometry and to keep the smaller grains thermally stable to reduce media noise. US patent publication 2004/0185307 describes magnetic recording layers employing an ordered alloy such as CoPt and FePt having an L10 structure. While such an L10 ordered alloy in the PMR layer 150 can exhibit a high $K_u$ that is beneficial for thermal stability and reduction of noise, the processing temperature which is conventionally required for such ordering to occur is relatively high and therefore relatively more expensive to manufacture than lower-temperature media. High ordering temperatures may also render L10-structured recording layers incompatible with a NiP layers, thereby limiting such media to glass substrates.

As such, lowering the ordering temperature of L10-structured recording layers in the PMR layer 150 advantageously reduces the expense of media manufacture as well as advances the art toward the goal of fabricating such media on aluminum substrates. Furthermore, by lowering the ordering temperature of the L10-structured recording layers, a higher $K_u$ is achieved for a given recording layer formation temperature and therefore a media structure enabling a lower ordering temperature can also be utilized to improve $K_u$ for any particular L10 alloy relative to the prior art.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Embodiments of the present invention include an ordering temperature reducing layer disposed below the magnetic recording layer to reduce the temperature at which the magnetic recording layer may be formed with L10 structure as provided by a textured nucleation layer disposed below the ordering temperature reducing layer. In the exemplary embodiment, an ordering temperature reducing layer having a thickness of 1.0 nm or less and containing a greater atomic percentage (at. %) of carbon than the magnetic recording layer is formed on a textured nucleation layer. As described in detail elsewhere herein, with proper selection of thickness, the L10 ordering achieved in a recording layer can more than double the out-of-plane coercivity of the recording media for certain recording layer formation temperatures (as compared to a media lacking the ordering temperature reducing layer). In certain embodiments, at least a 10% reduction in recording layer formation temperature is achieved for a given recording layer $K_u$.

Figure 2:
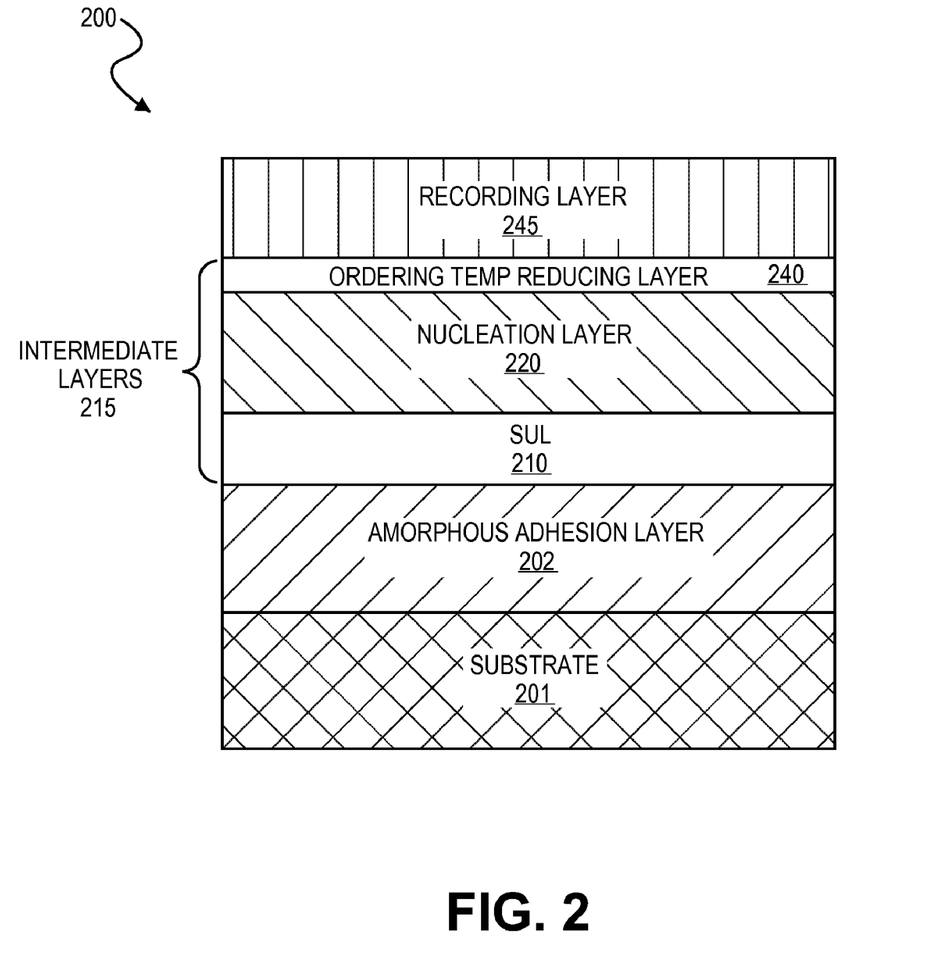
FIG. 2 illustrates a cross-sectional view of a FePtX recording media structure with a FePtX recording layer formed over an ordering temperature reducing layer, in accordance with an embodiment.

FIG. 2 illustrates a cross-sectional depiction of an exemplary embodiment of a PMR media structure 200 including an ordering temperature reducing layer 240 disposed between a nucleation layer 220 and a recording layer 245. It should be appreciated that the layers discussed herein may be formed on both sides of substrate to form a double-sided magnetic recording disk. However, only the layers on a single side of substrate are shown for ease of illustration. Alternatively, a single sided perpendicular magnetic recording disk may also be formed.

As depicted in FIG. 2, the PMR media structure 200 includes a substrate 201. Substrate 201 may be, for example, a glass, a metal, and/or a metal alloy material. In a particular embodiment, the substrate 201 is disk-shaped or annular. Glass substrates that may be used include, for example, a silica-containing glass such as borosilicate glass and aluminosilicate glass. Metal and metal alloy substrates that may be used include, for example, aluminum (Al), tantalum (Ta), and aluminum magnesium (AlMg) substrates. In an alternative embodiment, other substrate materials such as polymers and ceramics may be used.

An amorphous adhesion layer 202 is disposed over the substrate 201. As shown, the adhesion layer 202 may be disposed directly on the substrate 201. However, other material layers may intervene between the adhesion layer 202 and substrate 201. The adhesion layer 202 may be any amorphous material layer utilized in the recording media arts. In one embodiment where the substrate 201 is aluminum, the adhesion layer 202 is a nickel phosphorous (NiP) layer or an AlTi layer. In an alternative embodiment where the substrate 201 is a glass, the adhesion layer may be CrTi or CuTi. Either or both of the substrate top surface or the adhesion layer top surface may be polished.

Disposed between the amorphous adhesion layer 202 and a recording layer 245 is a plurality of intermediate layers 215. One such intermediate layer is a soft underlayer (SUL) 210. Generally, the SUL 210 may include any materials known in the art. The SUL 210 itself may be a laminate or multilayer stack of a plurality of soft magnetic layers separated by non-magnetic or antiferromagnetic films. In one exemplary embodiment, the SUL 210 includes a synthetic antiferromagnet (SAF) structure comprising two amorphous soft ferromagnetic layers (e.g., CoTaZr or CoFeTaZr, etc.) antiferromagnetically coupled with one another across a spacer layer (e.g. ruthenium (Ru)) there-between. The thickness of the SUL 210 will generally be in the range of 5 nm to 60 nm.

The plurality of intermediate layers 215 may further include a textured nucleation layer 220 disposed between the SUL 210 and the recording layer 245. The intermediate layers 215 are to regulate the magnetic exchange coupling between the SUL 210 and recording layer 245. The textured nucleation layer 220 further serves to transfer texture to the recording layer 245 so that L10 ordering occurs. The nucleation layer 220 may itself include multiple layers. In one embodiment, the nucleation layer 220 includes a plurality of non-magnetic intermediate layers, one of which may be a structured nucleation layer for a finer crystalline structure and a c-axis preferred orientation of the recording layer 245. In the exemplary embodiment, the textured nucleation layer 220 includes a structured nucleation layer of CrX with an as-deposited surface (200) plane which evolves (002) texture from which a dominant crystal alignment plane (001) can be developed in the L10-type ordered alloy of the recording layer 245. For the CrX alloy nucleation layer, X may be any of: B, Mo, Ta, W, or CrRuB alloys with the exemplary embodiment being CrRu.

The textured nucleation layer 220 may further include another layer between the CrX alloy layer and the recording layer 245, for example to buffer lattice mismatch between the CrX nucleation layer and the recording layer 245. In specific embodiments, this nucleation layer includes one or more of Pt, Pd, C, Ag, RuAl, NiAl, Ru, Cu, and MgO. In the exemplary embodiment, the nucleation layer 220 includes a layer of MgO over a CrRu alloy layer to epitaxially transfer texture from the developed CrRu (002) layer to the recording layer 245. In alternate embodiments, the nucleation layer 220 includes one or more of Pt, Pd, Ag, RuAl, NiAl, Ru, Cu, and MgO in the absence of a CrX alloy layer. In one such embodiment, the nucleation layer 220 includes a layer of MgO which is disposed on the SUL 210, avoiding the use of a CrX alloy layer. It has been found that MgO alone, without the CrX layer, can develop texture which promotes L10 ordering of the recording layer 245. Depending on the composition of the nucleation layer 220 with respect to both the number of layers and constituents of each layer, the thickness of the nucleation layer 220 should be between about 3 nm and 30 nm.

Figure 3:
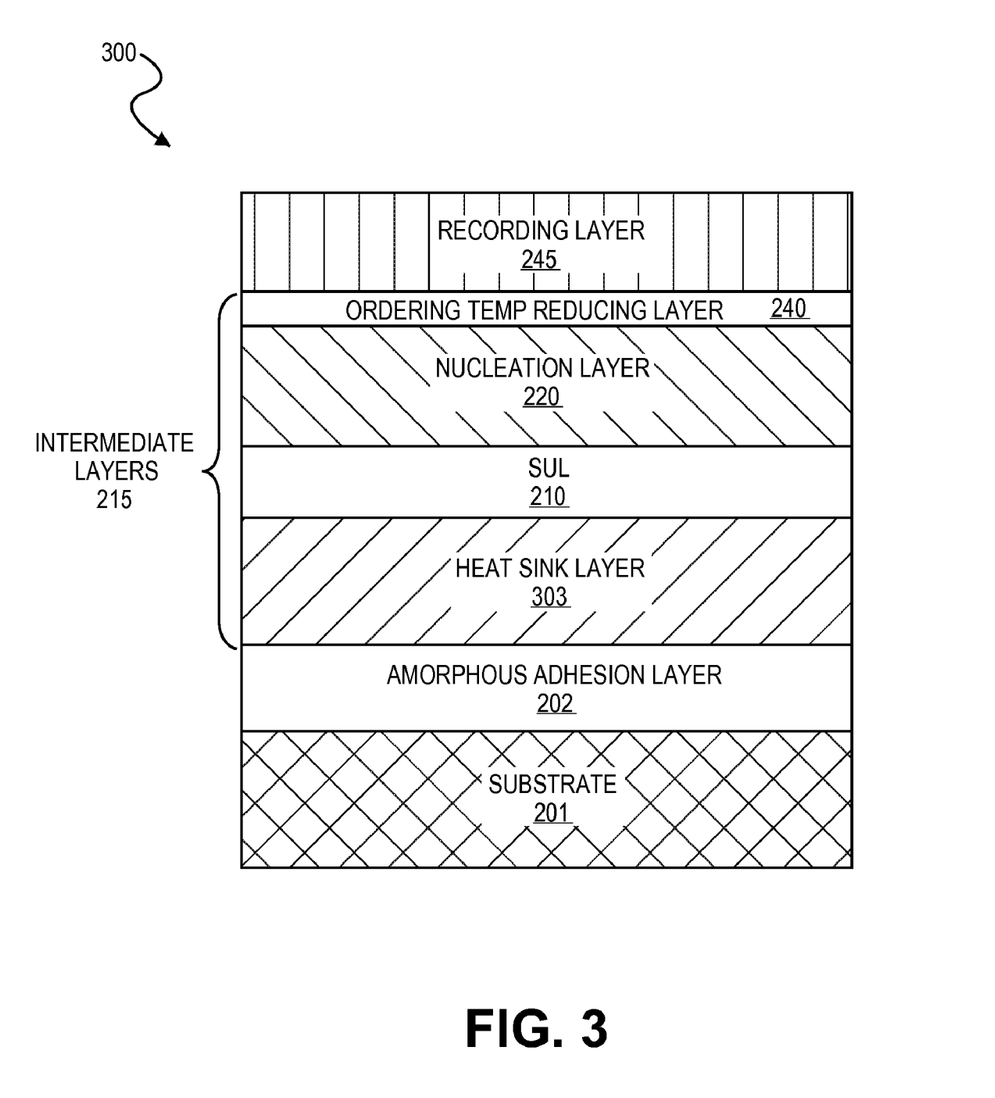
FIG. 3 illustrates a cross-sectional view of a composite FePtX media structure with a FePtX recording layer formed over an ordering temperature reducing layer, in accordance with an embodiment.

As illustrated in FIG. 3, the plurality of intermediate layers 215 may further include a heat sink layer 303 to facilitate heat transfer in energy-assisted magnetic recording embodiments (e.g., heat assisted magnetic recording (HAMR)/thermally assisted magnetic recording (TAMR) or optically assisted magnetic recording (OAMR)). As shown in FIG. 3, the heat sink layer 303 disposed above the substrate 201 in the PMR media 300. Although this exemplary embodiment depicts the heat sink layer 303 is disposed between the SUL 210 and adhesion layer 202, it should be appreciated the heat sink layer 303 may alternatively be disposed between the SUL 210 and the nucleation layer 220. Generally, regardless of the position within the media structure, the heat sink layer 303 is a metal or other heat conductive material. In the exemplary embodiment, the heat sink layer 303 is made of copper (Cu) with a thickness between 30 nm and 100 nm.

As illustrated in FIGS. 2 and 3, the plurality of intermediate layers 215 further include an ordering temperature reducing layer 240 disposed between the magnetic recording layer 245 and the textured nucleation layer 220. The ordering temperature reducing layer 240 has a composition distinct from that of both the recording layer 245 and the textured nucleation layer 220.

In the exemplary embodiment, the ordering temperature reducing layer 240 contains carbon. The atomic percentage (at. %) of carbon in the ordering temperature reducing layer 240 is greater than the atomic percentage of carbon in the magnetic recording layer. In a particular embodiment, the ordering temperature reducing layer 240 contains more the 50 at. % carbon. In one such embodiment, the ordering temperature reducing layer 240 contains more than 99 at. % carbon (i.e., essentially a pure carbon layer). The ordering temperature reducing layer 240 may have a thickness anywhere between 0.2 nm and 1.0 nm with the exemplary thickness being between approximately 3 and 5 Å for a pure carbon layer. In particular embodiments, the ordering temperature reducing layer 240 is a bulk material layer having a thickness greater than a single interfacial monolayer.

Disposed over the ordering temperature reducing layer 240 is the magnetic recording layer 245 having a relatively higher out of plane coercivity than that of the SUL 210. The magnetic recording layer 245 may be single material layer or a composite including a plurality of layers of differing material composition and/or magnetic property. In one exemplary embodiment, the magnetic recording layer 245 includes at least a first magnetic recording layer and an exchange-spring layer, both of which possess a substantially perpendicular (out-of-plane) anisotropy field $H_k$. While there may be any number of magnetic recording layers in the recording layer 245, the layer in which the magnetic orientation is changed in direct response to a write field, as opposed to a magnetic torque-assisted write field, is referred to herein as the "exchange-spring layer."

In the PMR media structures 200 (FIG. 2) and 300 (FIG. 3), at least one layer of the magnetic recording layer 245 is an L10 ordered alloy, such as CoPtX or FePtX. In the exemplary embodiment, the magnetic recording layer 245 is an FePtX alloy, with a concentration of iron (Fe), platinum (Pt), and X to form a ($Fe_xPt_yX_{1-(x+y)}$) metal alloy, such as FePtC. For FePtC embodiments, the carbon content is below 50 at. % and preferably below about 40%. Constituents other than carbon may also be utilized in the FePtX alloy, such as, Cr, Zr, Cu, Ni, Ta, Co, and B, for example to stabilize the phase or tune the magnetic properties of the recording layer 245. For exemplary embodiments having an exchange-spring layer, the exchange spring layer is also an L10 ordered FePtX alloy containing any of the constituents provided above.

In certain embodiments, at least one layer of the recording layer 245 includes inter-granular exchange coupling. To provide grain isolation at least one layer of the recording layer 245 includes one or more oxide materials to form a FePtX-oxide system. Such an oxide material includes at least one of magnesium oxide (MgO), boron(III) oxide ($B_2O_3$), silicon dioxide ($SiO_2$), chromium oxides (e.g., chromium(IV) oxide ($CrO_2$) or chromium(III) oxide ($Cr_2O_3$)), titanium oxides (e.g., titanium(IV) oxide ($TiO_2$) or titanium(III) oxide ($Ti_2O_3$)), tantalum oxides (e.g., tantalum(V) oxide ($Ta_2O_5$)), niobium oxides (e.g., niobium(V) oxide ($Nb_2O_5$)), nickel oxides (e.g., nickel (II) oxide (NiO)), zirconium dioxide ($ZrO_2$), hafnium dioxide ($HfO_2$), vanadium oxides (e.g., vanadium(V) oxide ($V_2O_5$)), aluminum oxide ($Al_2O_3$) and tungsten oxides (e.g., tungsten(VI) oxide ($WO_3$) or tungsten (IV) oxide ($WO_2$)).

For certain embodiments of the recording layer 245 which include a plurality of layers, an exchange coupling layer may be disposed as an intervening layer between individual layers of the recording layer 245 (e.g., between an exchange-spring layer and another magnetic layer). Such an exchange coupling layer may include one or more of Pt, C, Pd, Ag, or MgO with the layer thickness being less than approximately 2 nm. In the exemplary embodiment, the exchange coupling layer is Pt and has a layer thickness of between approximately 0.2 nm and approximately 1.0 nm. In other embodiments, the exchange coupling layer includes both Pt and an oxide material such as one of more of $SiO_2$, $TiO_2$, $Cr_2O_3$, $WO_3$, and Ta oxide. Depending on the composition, magnetic properties and number of layers in the magnetic recording layer 245, the magnetic recording layer 245 may have a thickness ranging from 5 nm to 20 nm.

Completing the PMR media structures 200 and 300, one or more layers (not depicted) may be formed on over the recording layer 245. For example, an overcoat (OC) may be used on top of the top magnetic recording layer to meet tribological requirements such as contact-start-stop (CSS) performance and corrosion protection. Predominant materials for the overcoat layer are carbon-based materials, such as hydrogenated or nitrogenated carbon. A lubricant may be placed (e.g., by dip coating, spin coating, etc.) on top of the overcoat layer to further improve tribological performance. Exemplary lubricants include a perfluoropolyether or phosphazene lubricant or a composite thereof.

For the exemplary PMR media structures 200 and 300, the ordering temperature reducing layer 240 is thought to lower the surface energy below that of the textured nucleation layer 220 such that L10 ordering of the recording layer 245 is made more thermodynamically favorable. The optimum thickness of the ordering temperature reducing layer 240 is enough to reduce the surface energy of the nucleation layer 220 but not so thick as to impair transfer of the texture developed in the nucleation layer 220. Regardless of the mechanism, the effect of the ordering temperature reducing layer on is characterized in FIGS. 4-7.

Figure 4:
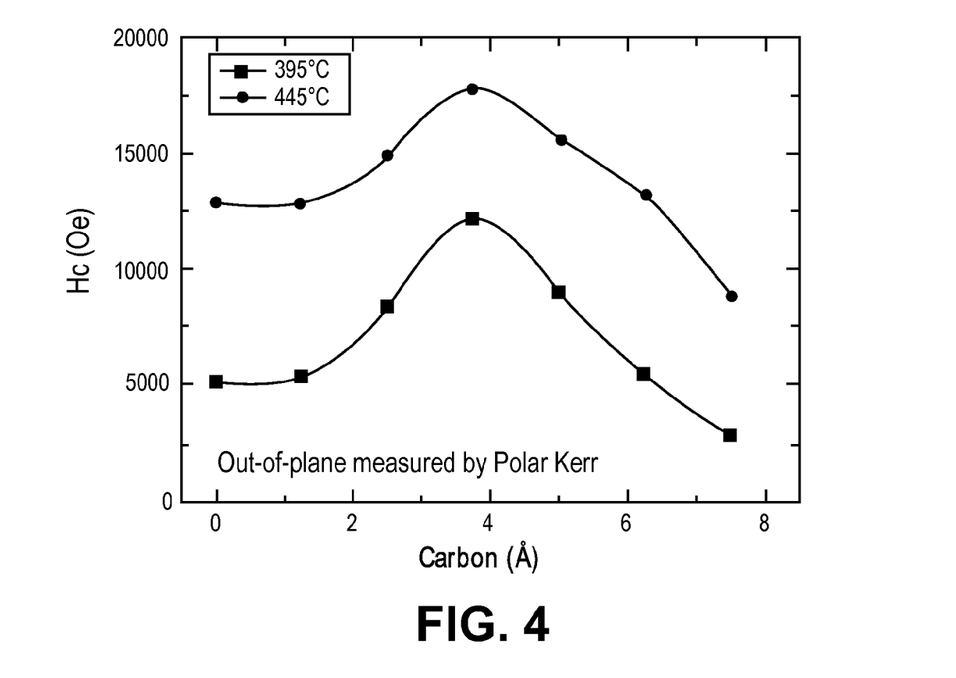
FIG. 4 illustrates out-of-plane coercivity for a FePtC recording media structure including an ordering temperature reducing layers of varying thickness, in accordance with embodiments.

FIG. 4 illustrates Polar-Kerr measurements graphed with the out-of-plane coercivity (plotted on the y-axis) for a FePtC recording layer 245 disposed over carbon ordering temperature reducing layers of varying thickness (along the x-axis). The thickness of the carbon layer was deduced based on dividing a known deposition rate by the duration of deposition. The two different curves depicted in FIG. 4 represent two different recording layer formation temperatures (395° C. and 445° C.). As illustrated, for both recording layer formation temperatures, the out-of-plane coercivity ($H_C^\perp$) increases from the control condition (0 Å of carbon) to a maximum value near 4 Å and decreases to a coercivity below that of the control at thicknesses beyond about 7 Å. Thus, for certain thicknesses the $K_u$ of the FePtC layer formed on the carbon layer is enhanced relative to the control.

Figure 5:
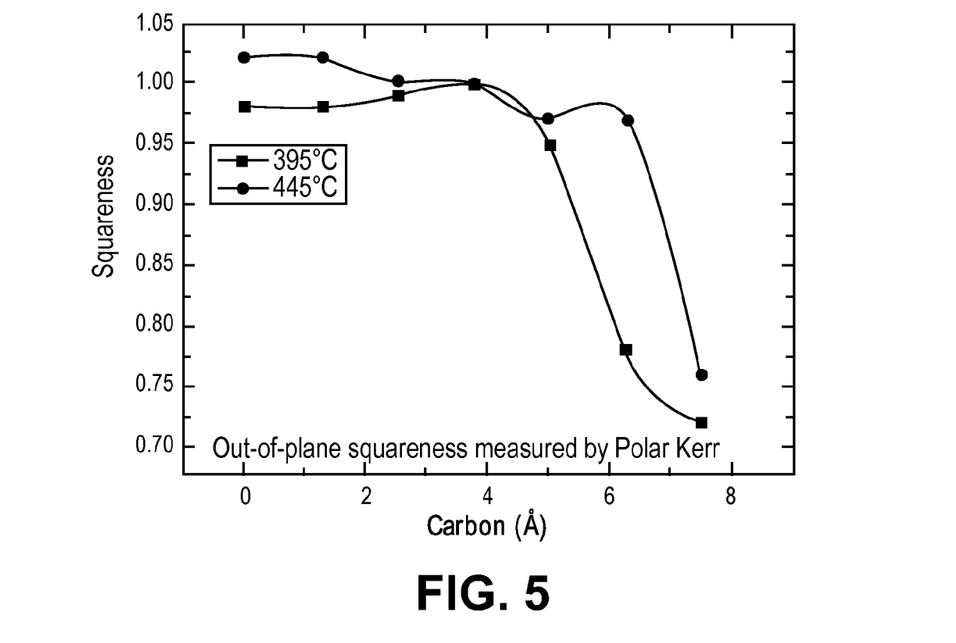
FIG. 5 illustrates out-of-plane squareness for a FePtC recording media structure including an ordering temperature reducing layers of varying thickness, in accordance with embodiments.

FIG. 5 illustrates Polar-Kerr measurements graphed with the out-of-plane squareness (plotted along the y-axis) for a FePtC recording layer 245 disposed over carbon ordering temperature reducing layers of varying thickness (plotted along the x-axis). Again, the thickness of the carbon was deduced based on dividing a known deposition rate by the deposition time. Like FIG. 4, the two different curves depicted in FIG. 5 represent two different recording layer formation temperatures for which the set of ordering temperature reducing layer thickness treatments were performed. As shown, for both the recording layer formation temperatures, the out-of-plane squareness is approximately 1.00 at a carbon layer thickness near 4 Å and decreasing to 0.75 with a carbon layer thickness beyond 7 Å. FIG. 4 and FIG. 5 indicate the optimal thickness of the ordering temperature reducing layer 240 is just under 4 Å for the particular FePtX alloy used in the experiments upon which FIGS. 4 and 5 are derived.

Figure 6:
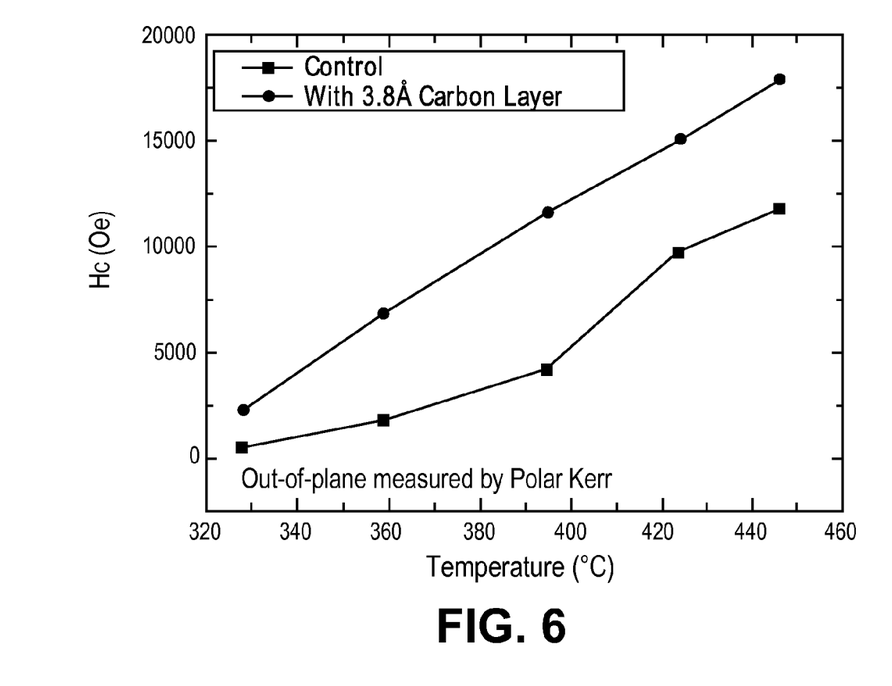
FIG. 6 illustrates out-of-plane coercivity for a FePtC recording media structure including an ordering temperature reducing layer and FePtC recording layers formed at different temperatures, in accordance with embodiments.

FIG. 6 illustrates Polar Kerr measurements graphing coercivity ($H_C^\perp$) for the same FePtC alloy from which FIGS. 4 and 5 were derived for a range of recording layer formation temperatures along the x-axis. For each treatment in FIG. 6, a FePtC recording layer was formed on a carbon layer having a thickness of approximately 3.8 Å (i.e., optimal thickness of those treatments illustrated in FIGS. 4 and 5). For each FePtC recording layer formation temperature depicted in FIG. 6, a corresponding control having no ordering temperature reducing layer (e.g., carbon thickness of 0) is also plotted to illustrate the effect of the ordering temperature reducing layer. As shown, $H_{C^\perp}$ increases for all recording layer formation temperatures. In particular, for the formation temperatures below 400° C. the ordering temperature reducing layer more than doubles $H_{C^\perp}$ relative to the control. As such, significantly lower temperatures may be utilized to form an L10-ordered recording layer having a particular $H_{C^\perp}$ or a significantly higher $K_u$ may be achieved for any particular recording layer formation temperature.

Figure 7:
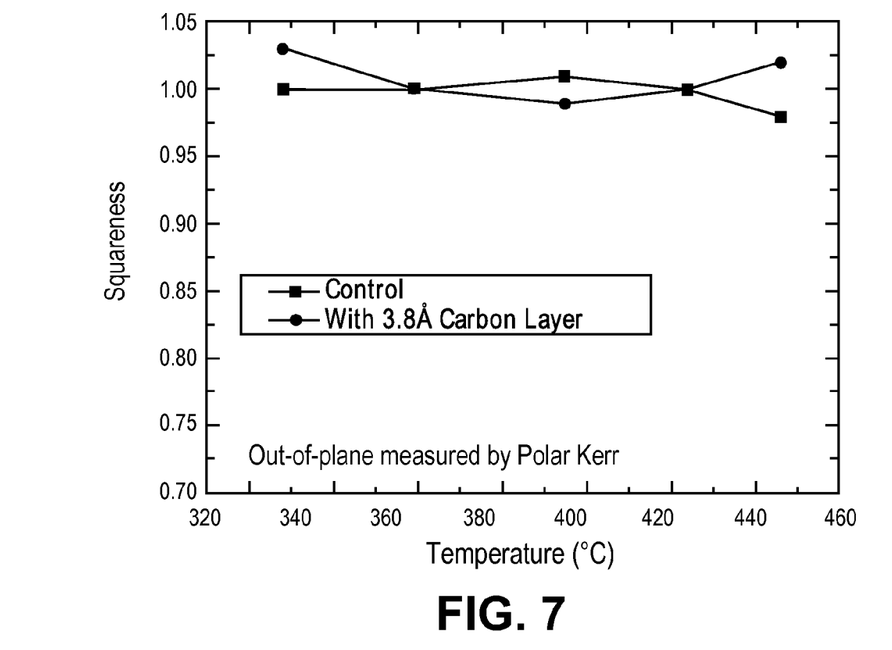
FIG. 7 illustrates out-of-plane squareness for a FePtC recording media structure including an ordering temperature reducing layer and FePtC recording layers formed at different temperatures, in accordance with embodiments.

FIG. 7 illustrates Polar Kerr measurements graphing out-of-plane squareness for the FePtC alloy for all the treatments depicted in FIG. 6. As shown, squareness is maintained across the entire range of recording layer formation temperatures. As FIGS. 6 and 7 illustrate, embodiments of ordering temperature reducing layer as described herein lower the L10 ordering temperature for the exemplary FePtC recording layer by at least 40° C.

Figure 8:
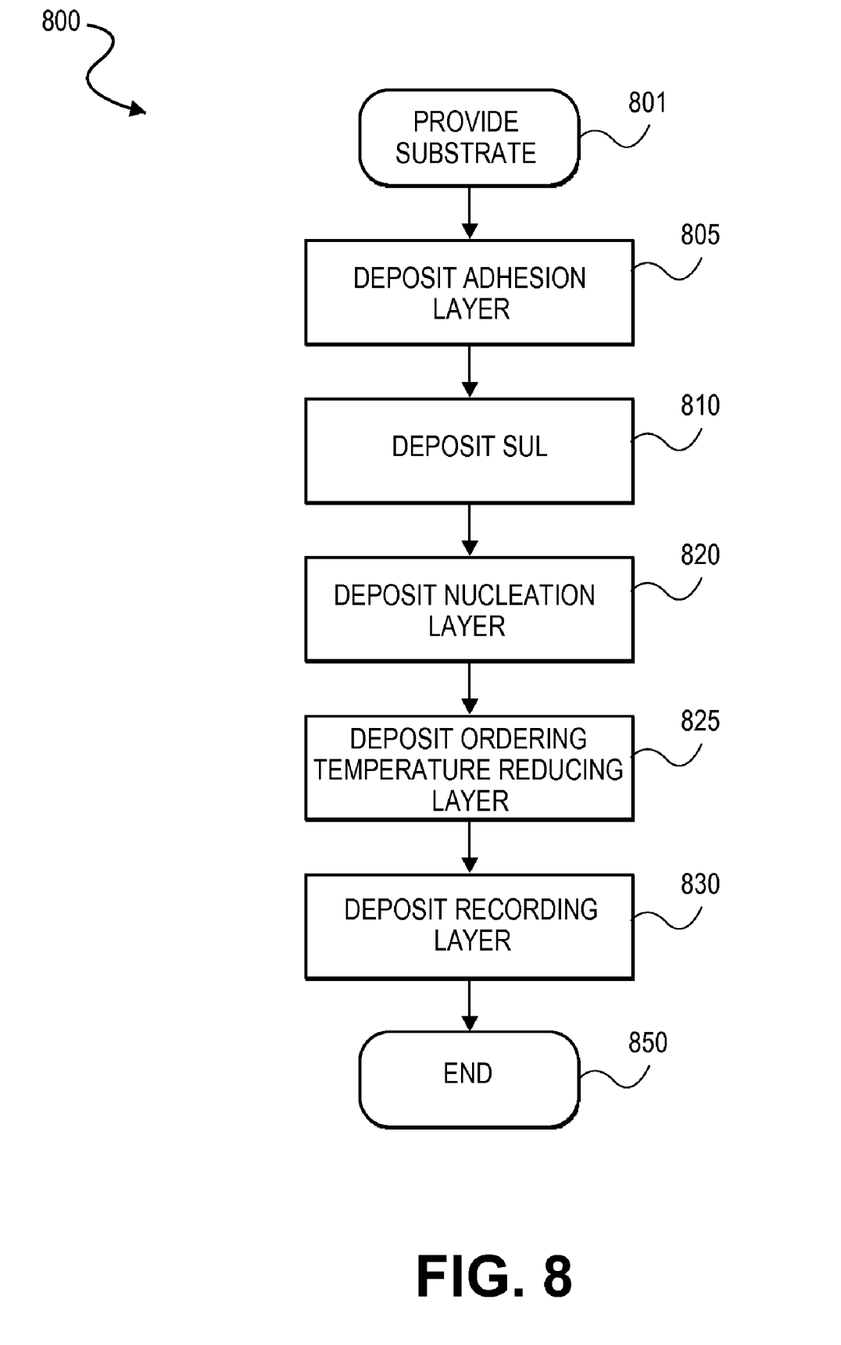
FIG. 8 illustrates one embodiment of a method of manufacturing a magnetic recording disk with a composite FePtX media structure including an ordering temperature reducing layer, in accordance with an embodiment of the present invention.

FIG. 8 illustrates one embodiment of a method of manufacturing perpendicular magnetic recording disk having a FePt-based PMR media structure such as that described elsewhere herein in reference to FIGS. 2 and 3. A substrate 201 is generated, or otherwise provided, at operation 801. The generation of a substrate for a magnetic recording disk is known in the art; accordingly a detailed discussion is not provided. At operation 805, an amorphous adhesion layer 202 is deposited on the substrate 201. In one embodiment employing an Al substrate, a NiP layer is deposited and polished. In an alternative embodiment employing a glass substrate, a CuTi or CrTi layer is deposited.

At operation 810, the SUL 210 including any of the materials described elsewhere herein, such as CoFeTaZr, is deposited over substrate 201 (e.g., on the amorphous adhesion layer 202 or on the heat sink layer 303). Any conventional deposition method configured for the formation of the SUL 210 may be utilized. In the exemplary embodiment, one or more layer of the SUL 210 is sputter deposited (i.e., physical vapor deposition (PVD)).

At operation 820 the nucleation layer 220 comprising any of the materials described elsewhere herein, such as an MgO layer on a CrRu layer, is deposited over the SUL 110. In alternative embodiments, an MgO layer is deposited directly on the SUL 210 or heat sink layer 303 with no intervening CrX layer. Although any deposition method may be employed at operation 820, in the exemplary embodiment the nucleation layer 220 is sputter deposited with predominantly (200) and/or (002) texture to promote the L10-ordering of the recording layer 245. Such texture may be achieved with sputter deposition while the substrate is at a temperature of between approximately 200° C. and 300° C.

At operation 825, the ordering temperature reducing layer 240 is formed over the nucleation layer 220. In one sputter deposition embodiment, following the formation of the topmost nucleation layer, a sputter target comprising at least 99 at. % carbon is sputtered to deposit, onto the topmost nucleation layer, a carbon layer having a thickness between 0.2 and 1.0 nm. The sputter deposition may also be performed at a temperature between approximately 200° C. and 300° C. (e.g., the substrate temperature following formation of the nucleation layer 220). It should also be noted that the ordering temperature reducing layer 240 may be formed by a chemical vapor deposition (CVD) method. For such an embodiment, any CVD capable of forming a carbonaceous film may be employed (e.g., amorphous carbon, diamond-like carbon (DLC), etc.). Depending on the method of forming the recording layer 245, forming the ordering temperature reducing layer 240 by either one of CVD or PVD may be somewhat more practical.

At operation 830 the recording layer 245 is formed on the ordering temperature reducing layer 240. In a particular embodiment, the magnetic recording layer 245 is deposited at a pressure between approximately 10 mTorr and 80 mTorr. For operation 825, the sputter target alloy composition may be any capable of achieving the compositions described elsewhere herein for the magnetic recording layer 245. In one embodiment, the sputter target includes a matrix having FePtX and one or more oxide materials. In still other embodiments, at operation 825, the various constituents of the magnetic recording layer 245 (e.g., metal matrix species, oxides) may be deposited on a substrate using a plurality of targets. Multi-target deposition methods are known in the art and generally consist of simultaneously sputtering separate targets or target portions, each of differing composition to form a mixture of the plurality of target compositions on a substrate. Each target of a multi-target system may be in a separate sputter station and each sputter station may include, for example, a DC magnetron source (for metal targets) and RF magnetron source (e.g. for oxide targets). Thus, while one exemplary embodiment includes a single sputter target of a FePtC-oxide alloy which is DC magnetron sputtered to form the first magnetic recording layer 245, one of ordinary skill in the art will appreciate a similar multi-target process may also be performed.

In particular embodiments, the presence of the ordering temperature reducing layer 240 is utilized to reduce the temperature at which the recording layer 245 is formed. In one embodiment, a granular FePtC alloy layer containing less than 50 at. % carbon, and having any of the compositions discussed elsewhere herein, is formed with L10 ordering at a temperature below 425° C. to a thickness between 3 nm and 15 nm. For one such embodiment, the L10-ordered recording layer 245 formed has an out-of-plane coercivity of at least 14,000 Oe. Absent the ordering temperature reducing layer 240, a granular FePtC of a same composition and with such a thickness would be expected to have a much lower coercivity (e.g., as illustrated in FIGS. 4-7). In a further embodiment, a granular FePtC alloy layer containing less than 50 at. % carbon, and having any of the compositions discussed elsewhere herein, is formed with L10 ordering at a temperature below 390° C., to a thickness between 3 nm and 15 nm. In one such embodiment, the L10-ordered recording layer 245 formed has an out-of-plane coercivity of at least 10,000 Oe. Also at operation 825, any exchange coupling layers may also be deposited. For example, a substantially pure Pt target or a Pt-oxide target may be sputtered at a pressure between approximately 10 mTorr to 80 mTorr and a temperature of between approximately 200° C. and 460° C. Additional magnetic recording layers (such as an exchange spring layer) may then be formed to complete operation 825. The method 800 is then completed at operation 850 with an optional additional thermal treatment (e.g. anneal) and a deposition of a protection layer, such as the COC.

The deposition of each of the SUL 210, nucleation layer 220, ordering temperature reducing layer 240, and recording layer 245 may be accomplished by a variety of methods known in the art, for example, electroless plating, sputtering (e.g., static or in-line), chemical vapor deposition (CVD), ion-beam deposition (IBD), etc. Exemplary static sputter systems are available from manufacturers such as Intevac Inc. of Santa Clara, Calif. and Canon-Anelva Corp. of Japan. With in-line sputtering systems, disk substrates are loaded on a pallet that passes through a series of deposition chambers the deposit films successively on substrates. In-line sputtering systems are available from manufacturers such as Ulvac Corp. of Japan.

Figure 9:
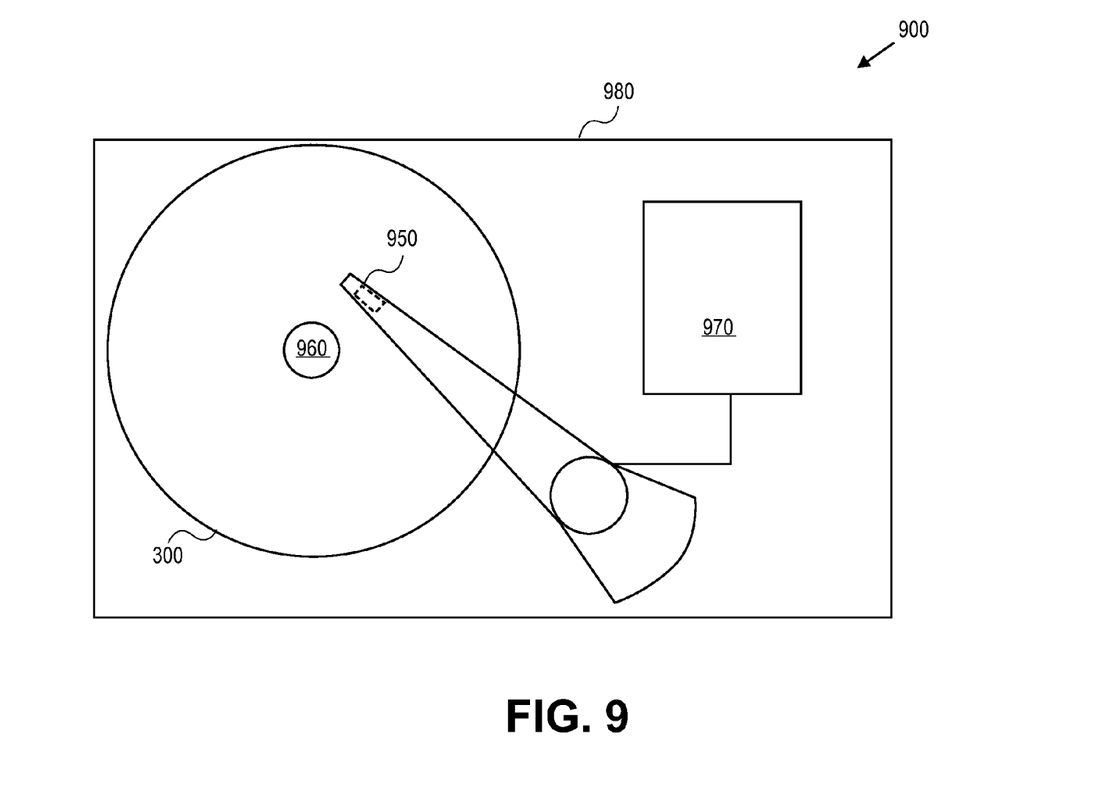
FIG. 9 illustrates a disk drive including a perpendicular magnetic recording disk with a FePtX recording media structure including an ordering temperature reducing layer in accordance with an embodiment of the present invention.

FIG. 9 illustrates a disk drive having disk 300. Disk drive 900 may include one or more disks 300 to store data. In embodiments, the disk 300 has the media structure 200 or media structure 300, as depicted in FIG. 2 and FIG. 3, respectively. Disk 300 resides on a spindle assembly 960 that is mounted to drive housing 980. Data may be stored along tracks in the magnetic recording layer of disk 300. The reading and writing of data is accomplished with head 950 that has both read and write elements. The write element is used to alter the properties of the perpendicular magnetic recording layer of disk 300. In one embodiment, head 950 may have magneto-resistive (MR), or giant magneto-resistive (GMR) elements. In an alternative embodiment, head 950 may be another type of head, for example, an inductive read/write head or a Hall effect head. The disk drive 900 may be a heat assisted magnetic recording (HAMR) drive and incorporate components of a laser source, a waveguide, and a near-field transducer (not depicted). Techniques in generating and focusing a laser beam are known in the art, and thus, are not described in particular detail. A spindle motor (not shown) rotates spindle assembly 960 and, thereby, disk 300 to position head 950 at a particular location along a desired disk track. The position of head 950 relative to disk 300 may be controlled by position control circuitry 970. The use of disk 300 fabricated in the manners discussed above may improve the performance of the perpendicular magnetic recording layer of disk 300 by providing a higher magnetic anisotropy from an L10-ordered recording layer. The use of disk 300 fabricated in the manners discussed above may also enable the use of L10-structured media on non-glass substrates.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A recording medium for perpendicular recording applications, the recording medium comprising:
   a magnetic recording layer comprising a FePtX alloy and having an axis of magnetic anisotropy substantially perpendicular to the surface thereof;
   a soft magnetic underlayer disposed under the magnetic recording layer and physically coupled to the magnetic recording layer through a plurality of intermediate layers magnetically decoupling the soft magnetic underlayer from the magnetic recording layer, wherein the plurality of intermediate layers further comprises:
   a first textured nucleation layer; and
   an ordering temperature reducing layer disposed between the magnetic recording layer and the first textured nucleation layer, the ordering temperature reducing layer comprising a greater carbon at. % than the magnetic recording layer,
   wherein the first textured nucleation layer is selected from the group consisting of Pt, Pd, Ag, RuAl, NiAl, Ru, Cu, and MgO layers.

2. The recording medium as in claim 1, wherein the ordering temperature reducing layer comprises more than 50 at. % carbon.

3. The recording medium as in claim 2, wherein the ordering temperature reducing layer comprises at least 99 at. % carbon.

4. The recording medium as in claim 3, wherein the ordering temperature reducing layer consists of carbon and has a thickness between 0.2 and 1.0 nm.

5. The recording medium of claim 4, wherein the FePtX alloy is disposed on the ordering temperature reducing layer, wherein the FePtX alloy comprises an L10-ordered alloy of FePtC, and wherein the recording layer has a thickness between 3 and 15 nm and an out-of-plane coercivity greater than 15000 Oe.

6. The recording medium as in claim 1, wherein the plurality of intermediate layers further comprises a second textured nucleation layer disposed below the first textured nucleation layer and wherein the second textured nucleation layer comprises a CrX alloy, where X is selected from the group consisting of: B, Mo, Ta, W, Ru and alloys thereof.

7. The recording medium of claim 5, wherein the magnetic recording layer includes at least one oxide material selected from the group consisting of SiO2, TiO2, Ta oxide, Cr2O3, and WO3.

8. The recording medium as in claim 1, wherein the FePtX alloy further comprises a concentration of iron (Fe), platinum (Pt), and X to form a (FexPtyX1-(x+y)) metal alloy, wherein X is selected from the group consisting of C, Cr, Zr, Cu, Ta, Co, B and wherein the magnetic recording layer includes at least one oxide material selected from the group consisting of SiO2, MgO, Al2O3, TiO2, Ta oxide, Cr2O3, B2O3.

9. The recording medium as in claim 1, further comprising an amorphous adhesion layer disposed below the soft magnetic underlayer, the adhesion layer selected from the group consisting of CrTi, CuTi, AlTi, and NiP.

10. The recording medium as in claim 9, further comprising a heat sink layer, wherein the heat sink layer is either disposed between the soft magnetic underlayer and the amorphous adhesion layer or disposed between the soft magnetic underlayer and the first textured nucleation layer.

11. A recording device for perpendicular recording applications, the recording device comprising:
    a recording head for reading magnetic signals from, and writing magnetic signals to, a recording medium; and
    a recording medium configured for perpendicular recording, the recording medium further comprising:
       a magnetic recording layer comprising a FePtX alloy and having an axis of magnetic anisotropy substantially perpendicular to the surface thereof;
       a soft magnetic underlayer disposed under the magnetic recording layer and physically coupled to the magnetic recording layer through a plurality of intermediate layers magnetically decoupling the soft magnetic underlayer from the magnetic recording layer, wherein the plurality of intermediate layers further comprises:
          a textured nucleation layer; and
          an ordering temperature reducing layer disposed between the magnetic recording layer and the textured nucleation layer, the ordering temperature reducing layer comprising a greater carbon at. % than the magnetic recording layer,
    wherein the recording medium further comprises a heat sink layer, wherein the heat sink layer is either disposed between the soft magnetic underlayer and an amorphous adhesion layer or disposed between the soft magnetic underlayer and the textured nucleation layer.

12. The recording device as in claim 11, wherein the ordering temperature reducing layer has a carbon content greater than 50 at. % and the ordering temperature reducing layer has a thickness between 0.2 and 1.0 nm.

13. The recording device of claim 12, wherein the FePtX alloy is an L10 ordered alloy of FePtC with a carbon content that is below 50 at. % and the recording layer has a thickness between 3 and 15 nm.

14. A method for fabricating a perpendicular recording media, the method comprising:
   forming a first textured nucleation layer over a soft magnetic underlayer;
   forming an ordering temperature reducing layer over the first textured nucleation layer; and
   epitaxially growing a magnetic recording layer on the ordering temperature reducing layer, wherein the magnetic recording layer comprises a FePtX alloy, wherein the magnetic recording layer has an axis of magnetic anisotropy substantially perpendicular to the surface thereof, and wherein the ordering temperature reducing layer comprises a greater carbon at. % than the magnetic recording layer,
   wherein the soft magnetic underlayer is physically coupled to the magnetic recording layer through a plurality of intermediate layers magnetically decoupling the soft magnetic underlayer from the magnetic recording layer, and wherein the plurality of intermediate layers comprises the first textured nucleation layer, and the ordering temperature reducing layer, and
   wherein the first textured nucleation layer is selected from the group consisting of Pt, Pd, Ag, RuAl, NiAl, Ru, Cu, and MgO layers.

15. The method of claim 14, wherein forming the ordering temperature reducing layer further comprises sputtering a target comprising at least 99 at. % carbon to deposit, onto the first textured nucleation layer at a temperature between 200° C. and 300° C., a carbon layer having a thickness between 0.2 and 1.0 nm.

16. The method of claim 14, wherein forming the recording layer further comprises depositing, at a temperature below 425° C., a granular alloy of FePtC comprising less than 50 at. % carbon to a thickness between 3 nm and 15 nm and with an out-of-plane coercivity of at least 14,000 Oe.

17. The method of claim 14, wherein forming the recording layer further comprises depositing, at a temperature below 390° C., a granular alloy of FePtC comprising less than 50 at. % carbon to a thickness between 3 nm and 15 nm and with an out-of-plane coercivity of at least 10,000 Oe.

* * * * *